United States Patent
Yoo et al.

(10) Patent No.: US 8,265,334 B2
(45) Date of Patent: Sep. 11, 2012

(54) METHOD FOR REVERSIBLE IMAGE WATERMARKING BASED ON INTEGER-TO-INTEGER WAVELET TRANSFORM

(75) Inventors: Chang-Dong Yoo, Daejeon (KR); Sun-Il Lee, Yongin-si (KR)

(73) Assignee: Korea Advanced Institute of Science and Technology, Taejon (KR)

( * ) Notice: Subject to any disclaimer, the term of this patent is extended or adjusted under 35 U.S.C. 154(b) by 1014 days.

(21) Appl. No.: 12/244,453

(22) Filed: Oct. 2, 2008

(65) Prior Publication Data

US 2009/0116685 A1 May 7, 2009

(30) Foreign Application Priority Data

Oct. 5, 2007 (KR) .................. 10-2007-0100397

(51) Int. Cl.
*G06K 9/00* (2006.01)
(52) U.S. Cl. ........................................ 382/100
(58) Field of Classification Search .................. 382/100
See application file for complete search history.

(56) References Cited

U.S. PATENT DOCUMENTS

| | | | | |
|---|---|---|---|---|
| 7,457,431 B2 * | 11/2008 | Shi et al. | ................ | 382/100 |
| 7,561,714 B2 * | 7/2009 | Tian et al. | ................ | 382/100 |
| 7,706,566 B2 * | 4/2010 | Shi et al. | ................ | 382/100 |
| 7,974,477 B2 * | 7/2011 | Shi et al. | ................ | 382/232 |
| 2006/0120558 A1 * | 6/2006 | Shi et al. | ................ | 382/100 |
| 2008/0002851 A1 * | 1/2008 | Shi et al. | ................ | 382/100 |

OTHER PUBLICATIONS

Guorong Xua; Shi, Y.Q.; Chengyun Yang; Yizhan Zheng; Zou, D.; Peiqi Chai;, "Lossless Data Hiding Using Integer Wavelet Transform and Threshold Embedding Technique," Multimedia and Expo, 2005. ICME 2005. IEEE International Conference on , vol., No., pp. 1520-1523, Jul. 6-6, 2005.*

Coltuc, D.; Chassery, J.-M.;, "High Capacity Reversible Watermarking," Image Processing, 2006 IEEE International Conference on , vol., No., pp. 2565-2568, Oct. 8-11, 2006.*

* cited by examiner

*Primary Examiner* — Bhavesh Mehta
*Assistant Examiner* — Utpal Shah
(74) *Attorney, Agent, or Firm* — Sughrue Mion, PLLC

(57) ABSTRACT

Enhanced method for embedding watermarks based on integer-to-integer wavelet transform is provided. The method according to the present invention includes the steps of: (A) dividing an original image (X×Y) to a plurality of image blocks (M×N); (B) selecting image blocks for embedding an location information that indicates image blocks to be watermarked; (C) embedding the location information into the image blocks selected in the step (B); and (D) embedding watermarks into remaining image blocks which are not selected in the step (B).

6 Claims, 13 Drawing Sheets
(2 of 13 Drawing Sheet(s) Filed in Color)

(a)

(b)

(c)

(d)

(a)

(b)

(c)

(d)

(a)

(b)

(c)

(d)

(a)

(b)

(c)

(d)

METHOD FOR REVERSIBLE IMAGE WATERMARKING BASED ON INTEGER-TO-INTEGER WAVELET TRANSFORM

This application claims the benefit of Korean Patent Application No. 10-2007-100397, filed on Oct. 5, 2008 in Korea Industrial Property Office, which is hereby incorporated by reference in its entirety for all purposes as if fully set forth herein.

FIELD OF THE INVENTION

The present invention relates to an image watermarking, and more particularly, to a Reversible Image Watermarking based on Integer-to-Integer Wavelet Transform.

BACKGROUND OF THE INVENTION

In digital watermarking, an imperceptible signal referred as a watermark is embedded into multimedia data for various purposes such as copyright protection, fingerprinting, authentication, etc. The embedding of the watermark usually introduces irreversible distortion, although it may be quite small, in the original data. For applications where the availability of original data is essential, irreversible degradation of the original data is not acceptable, and incurred distortions need to be removed. Examples of such applications include multimedia archives, military image processing, and medical image processing for electronic patient records (EPRs) [1]. In multimedia archives, a content provider may not want the original content to be distorted even though the distortion is imperceptible to most users, and it may be too costly in terms of storage space to store both the original and the watermarked versions. In military image processing, images are gathered at a very high cost and are usually subjected to further processing steps such as extreme magnification. Any distortion may hinder accurate analysis of the image. In medical image processing, any modification to the original image may affect a doctor's diagnosis and lead to legal problems.

Any complications that can occur when using a conventional watermarking scheme in the applications listed above can be resolved by using the reversible (lossless, invertible, erasable, etc.) watermarking scheme. Although the embedding distortion is inevitable even in reversible watermarking, it can be removed, and the original data can be reconstructed from the watermarked version. Another advantage of the reversible watermarking is that the access to the original content can be controlled. In a conventional watermarking scenario, no one has access to the original content since the distortion due to the embedding of the watermark is not erasable. When the watermark is embedded in a reversible manner, an authorized person can access the original content by erasing the watermark, while the watermarked content is available to everyone.

When the original content can be recovered from the watermarked content, the watermarking scheme is said to have the reversibility (invertibility) property. Note that the reversibility property can also be obtained using standard (cryptographic) scrambling algorithms. However, the cryptographic approach completely obliterates any semantic understanding, which is not the case in reversible watermarking.

Recently, several reversible watermarking schemes have been proposed [2]-[17]. The concept of a reversible watermark was first introduced by Mintzer et al. [2]. The watermark that they embedded into an image was completely visible but could be removed since it was embedded in a reversible manner. Fridrich et al. extracted a vector which represented specific characteristics of pixel groups, compressed it without any loss, and embedded the watermark bits by appending it to the compressed vector [3]. Tian applied integer Haar wavelet transform to an image and embedded the watermark into high-frequency coefficients by difference expansion (DE) [4]. Alattar extended Tian's scheme and applied the DE to triplets [5] and quads [6] of adjacent pixels for reversible embedding. He also proposed a reversible watermarking scheme using the DE of a generalized integer transform [7]. Veen et al. applied the companding technique to reversibly embed a large amount of data into an audio signal [8]. Leest et al. applied Veen's method to image watermarking [9]. Vleeschouwer et al. proposed a lossless watermarking based on circular interpretation of bijective transformations [10]. Celik et al. generalized a well-known least-significant bit (LSB) substitution technique and achieved high capacity by using a prediction-based conditional entropy coder [11] [12]. Yang et al. proposed a reversible watermarking scheme based on integer DCT transform [13]. Xuan et al. reversibly embedded the watermark bits into the middle bit-plane of the middle and high frequency integer wavelet coefficients [14]. Kalker and Willems derived a theoretical bound on the embedding capacity for reversible data hiding [15]-[17].

In conventional reversible watermarking schemes, however, high embedding capacity without degrading the image quality can not be sufficiently achieved, so more advanced reversible watermarking schemes are being highly needed.

REFERENCES

References listed as follows are incorporated as the part of this specification.

[1] Coatrieux, H. Maitre, B. Sankur, Y. Rolland, and R. Collorec, "Relevance of watermarking in medical images," in Workshop of the Int. Telemedical Information Soc., IEEE EMBS Int. Conf. Information Technology Applications in Biomedicine, pp. 250-255, November 2000.

[2] F. Mintzer, J. Lotspiech, and N. Morimoto, "Safeguarding digital library contents and users: Digital watermarking," D-Lib Mag., December 1997.

[3] Jessica Fridrich, Miroslav Golijan, Rui Du, "Lossless data embedding for all image formats," in Proc. SPIE, Security and Watermarking of Multimedia Contents, San Jose, Calif., USA, 2002.

[4] Jun Tian, "Reversible Data Embedding Using a Difference Expansion," IEEE Trans. Circuts and Systems for Video Technology, vol. 13, no. 8, pp. 890-896, August 2003.

[5] Adnan M. Alattar, "Reversible watermark using difference expansion of triplets," in Proc. IEEE ICIP, vol. 1, pp. 501-504, Barcelona, Spain, September 2003.

[6] Adnan M. Alattar, "Reversible watermark using difference expansion of quads," in Proc. ICASSP, vol. 3, pp. 377-380, 2004.

[7] Adnan M. Alattar, "Reversible watermark using the difference expansion of a generalized integer transform," IEEE Trans. Image Processing, vol. 13, no. 8, pp. 1147-1156, August 2004.

[8] M. Veen, F. Bruekers, A. Leest, and S. Cavin, "High capacity reversible watermarking for audio," in Proc. SPIE, Security, Steganography, and Watermarking of Multimedia Contents, vol. 5020, pp. 1-11, January 2003.

[9] A. Leest, M. Veen, and F. Bruekers, "Reversible watermarking for images," in Proc. SPIE, Security, Steganography, and Watermarking of Multimedia Contents, San Jose, Calif., USA, January 2004.

[10] C. De Vleeschouwer, J. F. Delaigle, J. F., B. Macq, "Circular interpretation of bijective transformations in lossless watermarking for media asset management," IEEE Trans. Multimedia, vol. 5, no. 1, pp. 97-105, March, 2003.

[11] M. U. Celik, G. Sharma, A. M. Tekalp, and E. Saber, "Reversible data hiding," in Proc. IEEE ICIP, vol. 2, pp. 157-160, Rochester, USA, September, 2002.

[12] M. Celik, G. Sharma, A. M. Tekalp, and E. Saber, Localized lossless authentication watermark (LAW)", in Proc. SPIE, Security and Watermarking of Multimedia Contents, vol. 5020, no. 70, January 2003.

[13] Bian Yang, M. Schmucker, W. Funk, C. Busch, and Shenghe Sun, "Integer DCT-based reversible watermarking for images using companding technique," Proc. SPIE, Security, Steganography, and Watermarking of Multimedia Contents, San Jose, Calif., USA, January 2004.

[14] Guorong Xuan, Jidong Chen, Jiang Zhu, Yun Q. Shi, Zhicheng Ni, and Wei Su, "Lossless data hiding based on integer wavelet transform," in Proc. MMSP 2002, St. Thomas, US Virgin Islands, pp. 312-315, December, 2002.

[15] T. Kalker and F. Willems, "Capacity bounds and constructions for reversible data-hiding," in Proc. International Conference on Digital Signal Processing, vol. 1, pp. 71-76, June 2002.

[16] T. Kalker and F. Willems, "Capacity bounds and constructions for reversible data-hiding," in Proc. SPIE Conference on Security and Watermarking of Multimedia Content V, (Santa Clara (US)), January 2003.

[17] F. Willems and T. Kalker, "Coding theorems for reversible embedding," in Proc. DIMACS 2003, (Piscataway (US)), March 2003.

[18] Ingemar J. Cox, Matthew L. Miller, and Jeffrey A. Bloom, Digital Watermarking, San Mateo, Calif.: Morgan Kaufmann, 2001.

[19] X. Wu, "Lossless compression of continuous-tone images via context selection, quantization, and modeling," IEEE Trans. Image Proc., vol. 6, no. 5, pp. 656-664, May 1997.

[20] P. G. Howard, F. Kossentini, B. Martins, S. Forchhammer, and W. J. Rucklidge, "The emerging JBIG2 standard," IEEE Trans. Circuits and Systems for Video Technology, vo. 8, no. 7, pp. 838-848, 1998.

[21] A. R. Calderbank, I. Daubechies, W. Sweldens, and B. L. Yeo, "Wavelet transforms that map integers to integers," Applied and Computational Harmonics Analysis, vol. 5, no. 3, pp. 332-369, 1998.

[22] I. Daubechies and W. Sweldens, Factoring wavelet transforms into lifting steps, Technical report, Bell Laboratories, Lucent Technologies, 1996.

[23] Wim Sweldens, "The lifting scheme: a construction of second generation wavelets," SIAM J. Math. Anal., vol. 29, no. 2, pp. 511-546, March 1998.

[24] Michael D. Adams and Rabab K. Ward, "Symmetric-extension-compatible reversible integer-to-integer wavelet transforms," IEEE Trans. Signal Processing, vol. 51, no. 10, October 2003.

[25] M. Vetterli and J. Kovacevic, Wavelets and Sub-band Coding, Englewood Cliffs, N.J.: Prentice-Hall, 1995.

[26] R. C. Gonzalez and Richard E. Woods, Digital Image Processing, 2nd Edition, Prentice Hall, 2002.

[27] USC-SIPI Image Database [Online]. Available: http://sipi.usc.edu/services/database/Database.html.

SUMMARY OF THE INVENTION

Therefore, the object of the present invention is to provide a novel reversible watermarking method with high embedding capacity for digital images.

In the present invention, a novel reversible watermarking scheme with high embedding capacity for digital images is proposed. As shown in FIG. 1, an input image is divided into non-overlapping blocks, and the watermark is embedded into the high-frequency wavelet coefficients of each block. To achieve the reversibility, invertible integer-to-integer wavelet transforms [21]-[23] are used, and the conditions to avoid underflow and overflow in the spatial domain are derived for arbitrary wavelets and block sizes. The watermark payload includes not only messages but also side information required to reconstruct the original image at the decoder. Contrary to the existing reversible watermarking schemes, the proposed scheme does not require lossless compression with high complexity, such as JBIG2 [20], since the embedding capacity is induced not from the compression but from the statistical characteristic of the high-frequency wavelet coefficients. Furthermore, the block-based embedding makes the size of the side information that needs to be embedded small in proportion to the total embedding capacity. This advantage enables the proposed scheme to provide higher embedding capacity than the existing schemes. The proposed scheme also exploits adaptive embedding to improve the perceptual quality of the watermarked image. Rather than embedding watermark randomly or arbitrarily, the proposed method adaptively embeds watermark to give the highest quality for a given embedding capacity.

According to an aspect of the present invention, there is provided a method for embedding watermarks based on integer-to-integer wavelet transform.

The method includes the steps of: (A) dividing an original image (X×Y) to a plurality of image blocks (M×N); (B) selecting image blocks for embedding an location information that indicates image blocks to be watermarked; (C) embedding the location information into the image blocks selected in the step (B); and (D) embedding watermarks into remaining image blocks which are not selected in the step (B).

According to another aspect of the present invention, there is provided a method for embedding watermarks based on integer-to-integer wavelet transform.

This method includes the steps of: (A) dividing an original image (X×X) to a plurality of image blocks (M×N); (B) selecting image blocks for embedding an location information that indicates image blocks to be watermarked; (C) embedding the location information into the image blocks selected in the step (B); (C-1) creating a matrix (P) whose elements indicate the number of bits that can be shifted in each image block; and (D) embedding watermark and side information into remaining image blocks which are not selected in the step (B).

Preferably, the step (B) is performed by Least Significant Bit (LSB)-substitution method and the step (D) is performed by bit-shifting method.

Preferably, in the step (D), the side information includes the original LSBs and the matrix (P).

Preferably, the location information is a location matrix (L) whose size [(X/M)×(Y/N)] is same as the size of the number of image blocks, wherein the location matrix (L) is constructed by, $$L(i, j) = \begin{cases} 1, & \text{if } P(i, j) > 0 \\ 0, & \text{otherwise} \end{cases}$$

where $0 \leq i \leq (X/M)$ and $0 \leq j \leq (Y/N)$.

Preferably, the size of the matrix (P) is the same as the size of the number of image blocks [(X/M)×(Y/N)], and the step (C-1) further includes the steps of: (a) Setting an induced capacity (R) and all elements of the matrix (P) to zero; (b) Searching for the bit-shiftable blocks ($S_{ij}$) among the image blocks; (c) applying 1-bit shifting to all the bit-shiftable blocks ($S_{ij}$) searched in the step (b); (d) Searching for the block ($S_{\hat{i}\hat{j}}$) in which the watermark embedding may lead to the lowest mean-squared error among the blocks obtained by the step (c); (e) letting the induced embedding capacity (R) incremented by the number of shiftable blocks and letting the value of $P(\hat{i},\hat{j})$ incremented by 1; (f) determining whether the embedding capacity (R) is equal to or greater than the number of bits of watermarks and side information to be embedded; (g) performing the steps through (c) to (f) in case that the embedding capacity (R) is smaller than the number of bits of watermarks and side information to be embedded.

Preferably, after the step (f), the method further includes the step of: (f') deleting the block ($S_{\hat{i}\hat{j}}$) from the blocks ($S_{ij}$) in case that the value of $P(\hat{i},\hat{j})$ is equal to $p_{max}$ or that the block ($S_{\hat{i}\hat{j}}$) is not bit-shiftable.

Preferably, the step (f) is performed by the following inequality:

$$R \geq |B_m| + |B_o| = |B_m| + |B_l| = |B_m| + (XY)/(MN)$$

where $B_m$ is a set of message bits, $B_l$ is a set of bits in the location map (L), $B_o$ is a set of original LSBs replaced during the embedding of the location map via LSB-substitution, and | | is the cardinality of a set.

Preferably, the step (B) is performed by the following inequality:

$$s_{min} - E_{WN}(m,n) \leq S_M(m,n) \leq s_{max} - E_{WP}(m,n)$$

for 0<m<M and 0<n<N, where $s_{min}$ is a minimum pixel value, $s_{max}$ is a maximum pixel value, S is the image block, $S_M$ is a modified pixel block, and wherein $E_{WP}$ and $E_{WN}$ are given by the following equations:

$$E_{WP} = \sum_{i,j \in (HL_1 \cup LH_1 \cup HH_1)} \frac{1}{2}\{Q_{ij} + \text{ABS}(Q_{ij})\}$$

$$E_{WN} = \sum_{i,j \in (HL_1 \cup LH_1 \cup HH_1)} \frac{1}{2}\{Q_{ij} - \text{ABS}(Q_{ij})\}$$

where HL1, LH1 and HH1 are an high-low, low-high and high-high wavelet sub-band respectively.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

The foregoing and other objects, features and advantages of the present invention will become more apparent from the following detailed description when taken in conjunction with the accompanying drawings in which.

DETAILED DESCRIPTION OF THE PREFERRED EMBODIMENTS

Figure 1:
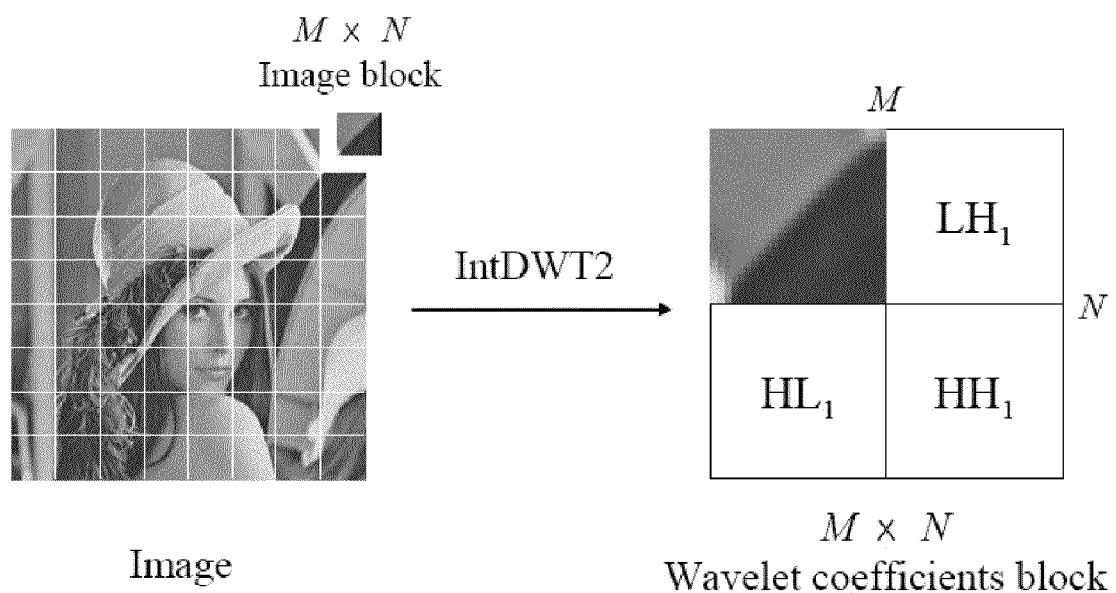
FIG. 1 is a diagram explaining wavelet transform.

Hereinafter, a preferred embodiment of the present invention will be described with reference to the accompanying drawings. In the following description and drawings, the same reference numerals are used to designate the same or similar components, and so repetition of the description on the same or similar components will be omitted.

I. Invertible Integer-To-Integer Wavelet Transforms

Conventional wavelet transform is not applicable to the reversible watermarking scheme since it does not guarantee the reversibility. For example, suppose that an image block consisting of integer-valued pixels is transformed into a wavelet domain using a floating-point wavelet transform. If the values of the wavelet coefficients are changed during the watermark embedding, the corresponding watermarked image block is no longer guaranteed to have integer values. Any truncation of the floating-point values of the pixels may result in a loss of information and may ultimately lead to the failure of the reversible watermarking systems, that is, the original image can not be reconstructed from the watermarked image. Furthermore, conventional wavelet transform is in practice implemented as a floating-point transform followed by a truncation or rounding since it is impossible to represent transform coefficients in their full accuracy: information can potentially be lost through forward and inverse transforms. To avoid this problem, an invertible integer-to-integer wavelet transform based on lifting is used in the proposed scheme [21]-[23]. It maps integers to integers and does not cause any loss of information through forward and inverse transforms.

According to [21], every wavelet or sub-band transform associated with finite length filters can be obtained as the Lazy wavelet followed by a finite number of primal and dual lifting steps and a scaling (the Lazy wavelet essentially splits the signal into its even and odd indexed samples). By combining the lifting constructions with rounding-off in a reversible way, a wavelet transform that maps integers to integers can be obtained. For example, the integer-to-integer wavelet transform that approximates Le Gall 5/3 filters is given by, $$d_{1,n} = s_{0,2n+1} - \lfloor \frac{1}{2}(s_{0,2n} + s_{0,2n+2}) + \frac{1}{2} \rfloor,$$

$$s_{1,n} = s_{0,2n} + \lfloor \frac{1}{4}(d_{1,n-1} + d_{1,n}) + \frac{1}{2} \rfloor \quad (1)$$

where $s_{1,n}$ and $d_{1,n}$ are the nth low-frequency and high-frequency wavelet coefficients at the jth level, respectively [21]. When j=0, $s_{0,n}$ represents the nth pixel value itself. The function [x] rounds x to the nearest integer towards minus infinity. To make transforms non expansive, symmetric extension compatible with invertible integer-to-integer wavelet transforms [24] is used.

II. Prediction of Underflow and Overflow

In the proposed scheme, a watermark is embedded into the wavelet coefficients using either the LSB substitution or the bit-shifting. With the LSB-substitution technique, the water mark is embedded by replacing the LSB of the selected wavelet coefficient with the watermark bit as follows:

$$c^w = 2 \cdot \lfloor c/2 \rfloor + w \quad (2)$$

where c, $c^w$, and w are the original and the watermarked wavelet coefficients and the watermark bit, respectively.

With the bit-shifting, or specifically p-bit-shifting technique, the original wavelet coefficient c is multiplied by $2^p$ where p is a positive integer and a watermark w is embedded into its p LSBs as follows:

$$c^w = 2^p \cdot c + w \quad (3)$$

where $w = 2^0 w_0 + 2^1 w_1 + \ldots + 2^{p-1} w_{p-1}$ and $\{w_0, w_1 \ldots w_{p-1}\}$ is a set of p watermark bits. Later we will find out that the value of p is adaptively determined for each bit-shiftable block so that the perceptual distortion of the watermarked image is minimized.

When the watermark is embedded in the wavelet domain using either LSB-substitution or bit-shifting, underflow or overflow can occur in the spatial domain. That is, the pixel values obtained from the watermarked wavelet coefficients can either be smaller than the minimum pixel value $s_{min}$ (e.g. $s_{min}=0$ for 8-bit gray-scale image) or be greater than the maximum value $s_{max}$ (e.g. $s_{max}=255$ for 8-bit grayscale image). Since the reversibility is lost when underflow or overflow occurs, it must be predicted prior to the watermark embedding. In the present invention, underflow and overflow are predicted by identifying the LSB-changeable and bit-shiftable image blocks. These blocks can be defined as follows.

(Definition 1): An image block is said to be LSB-changeable when a watermark bit-stream can be embedded into the LSBs of its high-frequency wavelet coefficients using the LSB-substitution without any underflow or overflow in the spatial domain.

(Definition 2): An image block is said to be bit-shiftable, or specifically p-bit-shiftable, when a watermark bit-stream can be embedded into its high-frequency wavelet coefficients using the bit-shifting by p bits without any underflow or overflow in the spatial domain.

The LSB-changeability and the bit-shiftability are not exclusive of each other. Therefore, a block can be both LSB-changeable and bit-shiftable. In the following subsections, the conditions to identify LSB-changeable and bit-shiftable blocks are derived for arbitrary wavelets and block sizes.

A. Derivation of Condition to Avoid Underflow and Overflow

In this subsection, the condition to avoid underflow and overflow is derived. The block-wise embedding using wavelet transforms and the notations that will be henceforth used are described in FIG. 2. First, an M×N pixel block S is transformed into a block of M×N wavelet coefficients C using the 2-dimensional non expansive integer-to-integer wavelet transform, IntDWT2(*). Next, a block of modified wavelet coefficients $C_M$ is obtained either by setting the LSBs of the chosen wavelet coefficients to zero or by applying bit-shifting to the chosen coefficients in C. The modified pixel block $S_M$ is obtained by applying the 2-dimensional inverse floating-point (fDWT2$^{-1}$(*)) wavelet transform to $C_M$. By adding a watermark bit block W to $C_M$, a block of watermarked wavelet coefficients $C_W$ is obtained. Then, $S_{WF}$ and $S_{WI}$ are obtained by applying fDWT2$^{-1}$(*) and IntDWT2$^{-1}$(*) to $C_W$, respectively. The embedding error $E_W$ is obtained by applying fDWT2$^{-1}$(*) to W. Henceforth, A(m,n) represents an element of the block A in the mth row and the nth column.

Figure 2:
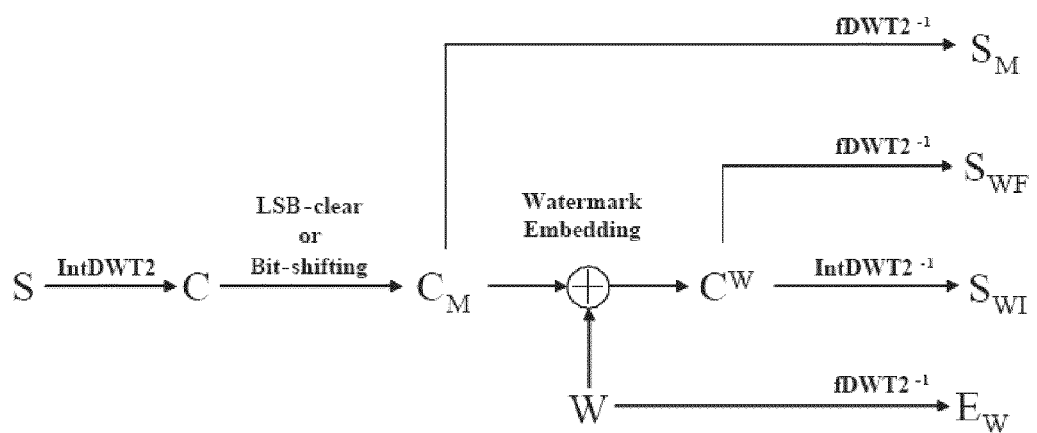
FIG. 2 is a diagram illustrating forward and inverse wavelet transform, and watermark embedding.

When a floating-point wavelet transform is used, underflow and overflow that can occur as a result of embedding a watermark in the wavelet domain can be easily predicted by exploiting the linearity of the transform. Then the watermarked block $S_{WF}$ in FIG. 2 is given by $$\begin{aligned} S_{WF} &= fDWT2^{-1}(C_W) \\ &= fDWT2^{-1}(C_M + W) \\ &= fDWT2^{-1}(C_M) + fDWT2^{-1}(W) \\ &= S_M + E_W. \end{aligned} \quad (4)$$

Given an image block S, $S_M$ in (4) can be straightforwardly determined. Thus whether underflow or overflow occurs is solely dependent on the error $E_W$ caused by the embedded watermark W. For an arbitrary watermark bit block W, two error matrices $E_{WP}$ and $E_{WN}$ whose elements represent limits of maximum positive and negative errors caused by the embedding can be obtained by exploiting the linearity of the conventional wavelet transform. The matrices $E_{WP}$ and $E_{WN}$ are given by $$E_{WP} = \sum_{i,j \in (HL_1 \cup LH_1 \cup HH_1)} \frac{1}{2}\{Q_{ij} + \text{ABS}(Q_{ij})\} \quad (5)$$

$$E_{WN} = \sum_{i,j \in (HL_1 \cup LH_1 \cup HH_1)} \frac{1}{2}\{Q_{ij} - \text{ABS}(Q_{ij})\} \quad (6)$$

where $Q_{ij} = fDWT2^{-1}(0_{ij})$ and the matrix $0_{ij}$ has only one non-zero element of value 1 in the ith row and the jth column. The wavelet sub-bands $HL_1$, $LH_1$, and $HH_1$ are the high-low, low-high, and high-high frequency sub-bands of the input image as described in FIG. 1, and the function ABS(A) takes absolute value of each element of a matrix A. Since the elements of $E_W$ satisfy the inequality $E_{WN}(m, n) \leq E_{WN}(m, n)$, neither underflow nor overflow will occur in S for any watermark block W if $$s_{min} - E_{WN}(m,n) \leq S_M(m,n) \leq s_{max} - E_{WP}(m,n) \quad (7)$$

for $0 \leq m \leq M$, $0 \leq n \leq N$.

In the proposed watermarking scheme, integer-to-integer wavelet transforms [21] are used to achieve the reversibility. Therefore, the watermarked image block that we obtain is not $S_{WF}$ but $S_{WI} = \text{IntDWT2}^{-1}(C_W)$. Since integer-to-integer wavelet transforms involve the truncations of wavelet coefficients during the lifting steps, round-off error is inevitable. Let $E_R$ be the round-off error matrix.

Then the watermarked image block SWI is given by:

$$\begin{aligned} S_{WI} &= \text{IntDWT2}^{-1}(C_W) \\ &= \text{IntDWT2}^{-1}(C_M + W) \\ &= fDWT2^{-1}(C_M + W) + E_R \\ &= S_M + E_W + E_R. \end{aligned} \quad (8)$$

As represented by $E_{WP}$ and $E_{WN}$, round-off error matrices $E_{RP}$ and $E_{RN}$ whose elements represent limits of maximum positive and negative round-off errors can be defined. Now, an image block S can be said to be LSB-changeable or bit-shiftable for any watermark block W if the following inequality is satisfied:

$$s_{min} - E_{WN}(m,n) - E_{RN}(m,n) \leq S_M(m,n) \leq s_{max} - E_{WP}(m,n) - E_{RP}(m,n) \quad (9)$$

for $0 \leq m \leq M$, $0 \leq n \leq N$.

B. Estimation of Round-off Error

Now the remaining problem is to estimate the round-off error in (9). For the simplicity, the 1-dimensional case is first analyzed. Let $e^R = [e_0^R \; e_1^R \; \ldots \; e_{N-1}^R]$ be the N-dimensional round-off error vector. The error vector can be sub-sampled into even-indexed vector ($e_0^R$) and odd-indexed vector ($e_1^R$). The relationship between the z-transforms of $e^R$, $e_0^R$, and $e_1^R$ denoted respectively as $E^R(z)$, $E_0^R(z)$, and $E_1^R(z)$ is given by $$E^R(z) = [1 \; z^{-1}] \begin{bmatrix} E_0^R(z^2) \\ E_1^R(z^2) \end{bmatrix} \quad (10)$$

Figure 3:
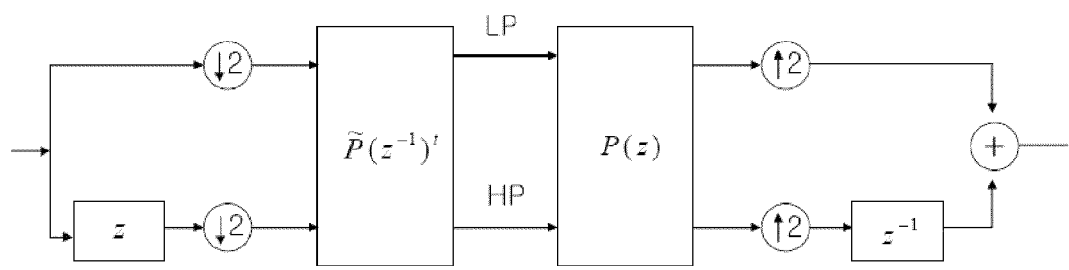
FIG. 3 is a poly-phase representation of wavelet transform.

FIG. 3 shows the poly-phase representation of wavelet transforms. Let (h,g) be a pair of two synthesis filters h (low-pass) and g (high-pass), and H(z) and G(z) be their z-transforms. Given a complementary filter pair (h,g), there always exist Laurent polynomial $S_i(z)$ and $T_i(z)$ for $1 \leq i \leq m$ and a non-zero constant K so that $$P(z) = \begin{bmatrix} H_0(z) & G_0(z) \\ H_1(z) & G_1(z) \end{bmatrix} \quad (11)$$

$$= \sum_{i=1}^{m} \begin{bmatrix} 1 & S_i(z) \\ 0 & 1 \end{bmatrix} \begin{bmatrix} 1 & 0 \\ T_i(z) & 1 \end{bmatrix} \begin{bmatrix} K & 0 \\ 0 & 1/K \end{bmatrix}$$

where P(z) is the poly-phase synthesis matrix [22] [25], $H(z) = H_0(z^2) + z^{-1} H_1(z^2)$, and $G(z) = G_0(z^2) + z^{-1} G_1(z^2)$. This means that every finite filter wavelet transform can be obtained by starting with the Lazy wavelet followed by m lifting and dual lifting steps followed with a scaling [22]. Using (11), the round-off errors $E_0^R(z)$ and $E_1^{R(z) \; in}$ (10) for $m \geq 2$ can be derived as $$\begin{bmatrix} E_0^R(z^2) \\ E_1^R(z^2) \end{bmatrix} = \begin{bmatrix} 1 & S_1(z) \\ 0 & 1 \end{bmatrix} \begin{bmatrix} U_{0,1}(z) \\ U_{1,1}(z) \end{bmatrix} + \quad (12)$$

$$\sum_{i=2}^{m} \left\{ \prod_{j=1}^{i-1} \begin{bmatrix} 1 & S_j(z) \\ 0 & 1 \end{bmatrix} \begin{bmatrix} 1 & 0 \\ T_j(z) & 1 \end{bmatrix} \begin{bmatrix} 1 & S_i(z) \\ 0 & 1 \end{bmatrix} \begin{bmatrix} U_{0,i}(z) \\ U_{1,i}(z) \end{bmatrix} \right\}$$

where $U_{0,i}(z)$ and $U_{1,i}(z)$ are the round-off errors of low-pass and high-pass bands at ith lifting step, respectively, and K is assumed to be 1. When m=1, the round-off errors are simply given as $$\begin{bmatrix} E_0^R(z^2) \\ E_1^R(z^2) \end{bmatrix} = \begin{bmatrix} 1 & S_1(z) \\ 0 & 1 \end{bmatrix} \begin{bmatrix} U_{0,1}(z) \\ U_{1,1}(z) \end{bmatrix} \quad (13)$$

The elements of the round-off errors $u_{0,i}$ and $u_{1,i}$ have the value between $-\frac{1}{2}$ and $\frac{1}{2}$. By exploiting this property and the linearity of (12) and (13), the round-off error vectors $e^{RP}$ and $e^{RN}$ whose elements represent limits of maximum positive and negative round-off errors can be easily obtained. For example, $e^{RP}$ and $e^{RN}$ for the integer-to-integer wavelet transform that approximates Le Gall 5/3 filter is given by, $$e^{RP} = -e^{RN} = [0.5 \; 1.0 \; 0.5 \; 1.0 \; 0.5 \; 1.0 \; 0.5 \; 1.0] \quad (14)$$

when the dimension of the rounding-off error vector is N=8.

Since 2-dimensional integer-to-integer wavelet transforms are used in the proposed scheme, the above procedure should be extended to the 2-dimensional case. A 2-dimensional wavelet transform is implemented by applying an 1-dimensional transform to each row of an input matrix and then to each column of the matrix whose rows are the results of the first transform. Therefore, the round-off error given in (12) or (13) becomes the input to the 1-dimensional integer-to-integer wavelet transform, thus total round-off error is the sum of the filtered error and the round-off error that occurs in the second transform. For example, $E_{RP}$ and $E_{RN}$ for the integer-to-integer wavelet transform that approximates Le Gall 5/3 filter is given by, $$E_{RP} = -E_{RN} = \begin{bmatrix} 1.25 & 2 & 1.25 & 2 & 1.25 & 2 & 1.25 & 2 \\ 2 & 3 & 2 & 3 & 2 & 3 & 2 & 3 \\ 1.25 & 2 & 1.25 & 2 & 1.25 & 2 & 1.25 & 2 \\ 2 & 3 & 2 & 3 & 2 & 3 & 2 & 3 \\ 1.25 & 2 & 1.25 & 2 & 1.25 & 2 & 1.25 & 2 \\ 2 & 3 & 2 & 3 & 2 & 3 & 2 & 3 \\ 1.25 & 2 & 1.25 & 2 & 1.25 & 2 & 1.25 & 2 \\ 2 & 3 & 2 & 3 & 2 & 3 & 2 & 3 \end{bmatrix} \quad (15)$$

III. Proposed Reversible Embedding Algorithm

Given an X×Y original image to be watermarked, a set of message bits $B_m$ to be embedded, block size (M×N), wavelet to be used for forward and inverse transforms, and the maximum number of bits allowed to be shifted $p_{max}$, the watermarks are reversibly embedded as explained in the following subsections.

Figure 13A:
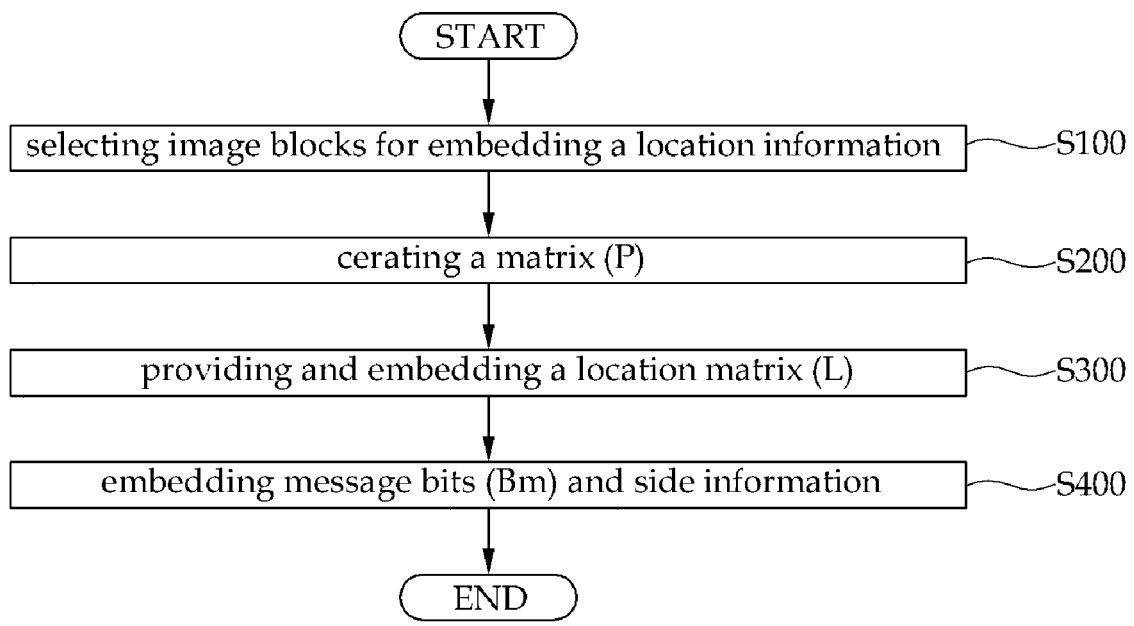
FIGS. 13A and 13B are a flow chart showing a reversible watermark embedding method according to the present invention.

FIG. 13A shows the process of embedding watermarks according to present invention. The first step is to select image blocks for embedding location information among the LSB-changeable blocks (Step S 100). The image blocks selected in step S 100 may not be reserved for embedding message bits and side information.

Next, the matrix P is created for adaptively embedding message bits and side information (Step S 200). Each element of the matrix P represents the number of shiftable bits for corresponding each image block. For example, if P(i, j) is 1, then an image block in the ith row and the jth column is 1-bit shiftable. The matrix P enables the message bits $B_m$ and side information to be adaptively embedded to the original image. In other words, each image block may be bit-shifted by the number according to the value of each element of the matrix P, and then the message bits $B_m$ and side information are embedded into the each image block until the number of total bits embedded is same as the number of bit-shifted. Accordingly, message bits $B_m$ and side information are embedded dispersively through the entire image block, which leads to the lowest mean-squared error.

Subsequently, data is embedded into the original mage block. The embedded data includes a location matrix or location map L, message bits $B_m$ and side information (P, $B_o$). The message bits $B_m$ is message bits for watermark data. The side information includes message bits for the matrix P and a set of original LSBs Bo which is replaced during the embedding of the location map via LSB-substitution. By preserving the original LSBs, the original content can be recovered from the watermarked content reversibly.

For data embedding, firstly, a data for a location matrix or location map L is embedded (Step S 300). Each elements of a location matrix L indicates whether the data is embedded in the image block or not. For example, if L(i, j) is 1, then the data is embedded in an image block in the ith row and the jth column of the location matrix L. Meanwhile, if L(i, j) is 0, then the data is not embedded in an image block in the ith row and the jth column of the location matrix L. The data for the location matrix L is embedded into the image block selected in the step S 100 by LSB-substitution method. The original LSBs Bo are to be embedded together with the message bits $B_m$.

Next, the message bits $B_m$ and side information Bo are embedded (Step S 400). The side information includes message bits for the matrix P and a set of original LSBs Bo replaced during the embedding of the location map via LSB-substitution.

Figure 13B:
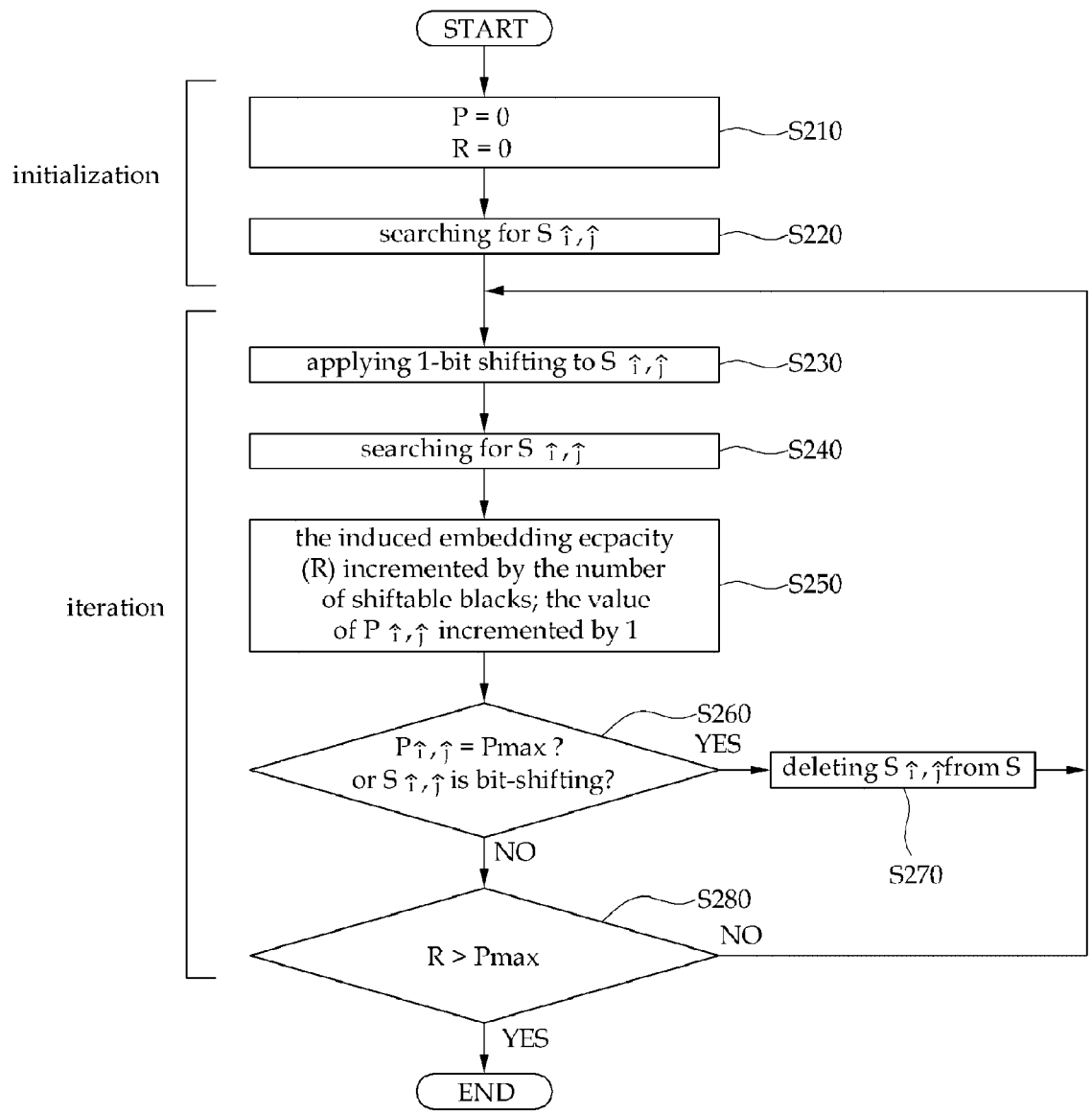

Hereinafter, a more detailed explanation for the method of the present invention described in FIG. 13A and FIG. 13B.

A. Reservation of LSB-Changeable Blocks for the Location Map (Step S 100)

The location map L is a binary matrix that indicates which blocks are watermarked. It is a part of the side information used by the decoder to retrieve the message bits and to reconstruct the original image. Since one bit is assigned to each block, the size of the location map is (X/M)×(Y/N).

To extract the watermark, the decoder has to retrieve the location map first. However, if the location map is embedded using the bit-shifting, it can not be retrieved since a bit-shiftable block can turn into a non-bit-shiftable block as a result of the watermark embedding, which means it would need its own location map to be identified. Therefore, the location map should be embedded into blocks that retain its characteristics even after the embedding. In the proposed scheme, the following property is exploited to embed the location map.

(Property 1): All LSB-changeable blocks remain LSB-changeable after the watermark is embedded using the LSB substitution.

Using this property, the location map can be embedded into a set of LSB-changeable blocks via LSB substitution. Since the LSB-changeability of the chosen blocks is maintained regardless of the watermark embedding, the decoder can identify the selected blocks and retrieve the location map.

The embedder first finds a number of LSB-changeable blocks with enough capacity to hold the location map in a predefined order. Depending on the application, the selection of the LSB-changeable blocks may be based on a secret key shared with the decoder. Since the size of the location map is (X/M)×(Y/N) and the maximum number of bits that can be embedded into one block is 3MN/4, the minimum number of LSB-changeable blocks necessary for the embedding of the location map is [(XY/MN)×(3MN/4)] Where the function [x] rounds x to the nearest integer towards plus infinity. The chosen blocks are reserved for the embedding of the location map, and not used for other purposes.

B. Distribution of Payload for Adaptive Embedding (Step S 200)

Even though the original image can be exactly reconstructed from the watermarked image, the quality of the watermarked image is still important. In this paper, the peak signal-to-noise ratio (PSNR) is used as a measure for quantifying the quality of an image. Therefore, the watermark needs to be embedded such that the mean-squared distortion between the original and the watermarked image is minimized. In order to achieve this goal, the bit-shiftable blocks in which the watermark embedding does not introduce severe distortion need to be found and used for the embedding. Since it is not known which specific watermark bits are embedded into each bit-shiftable block at this moment, the distortion introduced by the watermark embedding is estimated by, $$MSE(S, S_{WT}) \approx MSE(S, S_{BI}) \tag{16}$$

where the function $MSE(S_1, S_2)$ calculates the mean-square error between two image blocks $S_1$ and $S_2$.

The original and watermarked image blocks S and $S_{WT}$ are as shown in FIG. 2. The bit-shifted pixel block $S_{BI}$ is obtained by applying bit-shifting to the chosen wavelet coefficients of the original wavelet coefficients block C, and then performing 2-dimensional inverse integer-to-integer wavelet transform to it. This approximation is reasonable since the distortion introduced by the bit-shifting is much higher than the distortion introduced by the watermark embedding in most blocks. The detailed procedure to distribute the given payload so that the mean-squared distortion is minimized is described below. Here $S_{ij}$ denotes the block in the ith row and the jth column where $0 \leq i \leq (X/M)$ and $0 \leq i \leq (Y/N)$.

1) Initialization (Step S 210-220)

a) A matrix P is set to an (X/M)×(Y/N) zero matrix. Also, the induced capacity R is set to zero (S 210). Each element of the matrix P represents the number of shiftable bits for each corresponding image block. For example, if P(i, j) is 1, then an image block in the ith row and the jth column is 1-bit shiftable. Each element of the induced capacity R represents the capacity of bits that can be embedded into corresponding image blocks.

b) Among all the blocks except those reserved for the embedding of the location map, the 1-bit shiftable blocks are identified using (9). Let S be the set of the identified bit-shiftable blocks, and I be the set of its indices such that $I = \tilde{I} = \{(i,j) | S_{ij} \in S\}$. In other words, I is the set which represents locations of bit-shiftable blocks (S 220).

2) Iteration (Step S 230-280)

a) $\{P(i,j)+1\}$-bit-shifting is applied to all blocks in S where $(i,j) \in I$. Then $(S_{ij})_{BI}$ is obtained for each block in S by taking the inverse integer-to-integer wavelet transform to the bit-shifted wavelet coefficients (S 230).

b) The block $S_{\hat{i}\hat{j}}$ in which the watermark embedding may lead to the lowest mean-squared error among all bit-shiftable blocks is searched by the following equations (S 240).

$$(\hat{i}, \hat{j}) = \underset{(i,j) \in I}{\arg\min} MSE\{S_{ij}, (S_{ij})_{BI}\} \tag{17}$$

c) The induced embedding capacity R is incremented by $(3MN/4 - [\log_2(p_{max})])$ if $P(\hat{i},\hat{j}) = 0$, otherwise by (3MN=4).

The reserved $[\log_2(p_{max})]$ bits are used to embed the element of the matrix P which indicates how many bits are shifted in the corresponding block.

d) The value of $P(\hat{i},\hat{j})$ is incremented by 1 (S 250).

e) If $P(\hat{i},\hat{j}) = p_{max}$ or the block $S_{\hat{i}\hat{j}}$ is not $\{P(\hat{i},\hat{j})+1\}$-bit-shiftable, the block $S_{\hat{i}\hat{j}}$ and its index $(\hat{i},\hat{j})$ are deleted from S and I, respectively (S 270).

f) If the induced capacity R satisfies the following inequality, the iteration is terminated (S 280):

$$R \geq |B_m| + |B_o| = |B_m| + |B_l| = |B_m| + (XY)/(MN) \tag{18}$$

where $B_m$ is a set of message bits, $B_l$ is a set of bits in the location map L, $B_o$ is a set of original LSBs replaced during the embedding of the location map via LSB-substitution, and | | is the cardinality of a set.

If (18) is not satisfied, go to (a) and repeat the iteration from (a) to (e).

As a result of the procedure described above, the matrix P is obtained. It is used to adaptively embed the watermark into the image in a reversible manner.

C. Construction and Embedding of Location Map (Step S 300)

Each elements of a location map or location matrix L indicates the image block in which data is embedded. For example, if L(i, j) is 1, then the data is embedded in an image block in the ith row and the jth column of the location matrix L. Meanwhile, if L(i, j) is 0, then the data is not embedded in an image block in the ith row and the jth column of the location matrix L.

The (X/M)×(Y/N) location map L is constructed by, $$L(i, j) = \begin{cases} i, & \text{if } P(i, j) > 0 \\ 0, & \text{otherwise} \end{cases} \quad (19)$$

where $0 \leq i \leq (X/M)$ and $0 \leq j \leq (Y/N)$. Then (XY)/(MN) bits in the location map L is sequentially embedded into the reserved LSB-changeable blocks via LSB-substitution. The original LSBs replaced during the embedding of the location map are collected into the set Bo. For the reversibility, they are also embedded into the image.

D. Embedding of Message and Remaining Side Information (Step S 400)

The remaining payload to be embedded includes the message bits, the original LSBs, and the matrix P whose elements indicate how many bits are shifted in each block. First a set of the bit-shiftable blocks $S_b = \{S(i, j) | P(i, j) > 0\}$ into which the watermark is embedded is found using the matrix P that is constructed following the procedures described above. Next, P(i,j)-bit-shifting is applied to each block in $S_b$. As a result of the bit-shifting, $\{P(i,j)(3MN/4)\}$ bits are respectively available for the embedding for each block in Sb. For each block in $S_b$, first P(i,j) is converted to the binary number of the length $[\log_2(p_{max})]$ and embedded. Into remaining $[P(i,j) (3MN/4) - \log_2(p_{max})]$ bits available for the embedding in each block belonging to $S_b$, the message bits and the original LSBs are sequentially embedded.

E. Reversible Watermark Embedding for Color Images

The proposed reversible watermarking scheme can be easily applied to color images. First, given an image and block size, wavelet, and $p_{max}$, the maximum embedding capacity is estimated for each color channel, e.g. Rr (red channel), Rg (green channel), and Rb (blue channel) bits per pixel (bpp), respectively. Next, the set of the message bits Bm is divided into 3 subsets, $B_{mr}$, $B_{mg}$, and $B_{mb}$ whose cardinalities are respectively given by, $$|B_{mr}| = \left\lfloor \frac{|B_m| \cdot R_r}{(R_r + R_g + R_b)} \right\rfloor \quad (20)$$

$$|B_{mg}| = \left\lfloor \frac{|B_m| \cdot R_g}{(R_r + R_g + R_b)} \right\rfloor \quad (21)$$

$$|B_{mb}| = |B_m| - (|B_{mr}| + |B_{mg}|) \quad (22)$$

where $B_{mr} \cap B_{mg} = B_{mg} \cap B_{mb} = B_{mb} \cap B_{mr} = \emptyset$ and $B_{mr} \cup B_{mg} = B_{mg} \cup B_{mb} = B_{mb} \cup B_{mr} = B_m$. Then, the three subsets of the message bits $B_{mr}$, $B_{mg}$, and $B_{mb}$ are independently embedded into each color channel using the reversible watermarking scheme described above. This procedure can also be applied to the color images with other color coordinate, e.g. YUV [26], by dividing message bits into subsets and embedding them into each color channel independently.

IV. Decoding Algorithm

First, the watermarked image is divided into non-overlapping blocks with dimension M×N, and each block is transformed using the same wavelet used in the embedding procedure. Next, LSB-changeable blocks are searched in a predefined order. In some applications, the order of the search may be based on a secret key shared with the embedder. When the LSB-changeable blocks are found, the location map is retrieved by collecting the LSBs of the high-frequency wavelet coefficients in those blocks. Based on the location map, the blocks into which the watermark is embedded are sequentially searched, and the number of embedded bits is calculated by decoding the value of p in each block. Finally, the payload that includes the original LSBs and the message bits is extracted from the blocks indicated by the location map. Using the original LSBs and the location map, the original image block can be reconstructed exactly. For a color image that is watermarked, the decoding procedure given above is repeated for each color channel.

V. Experimental Results

In all experiments, 512×512 RGB and gray-scale images from the USC-SIPI database [27] were used as test images, and the integer-to-integer wavelet transform based on Le Gall 5/3 filters is used.

The embedding capacity and the quality of the watermarked image are represented by bit per pixel (bpp) and PSNR in dB, respectively. The message bits are randomly generated using the MATLAB function rand( ). Considering the quality of the watermarked image, the value of $p_{max}$ is set to 2, that is only 2-bit-shifting is allowed.

A. Performance for Natural Images with Various Block Sizes

Figure 4:
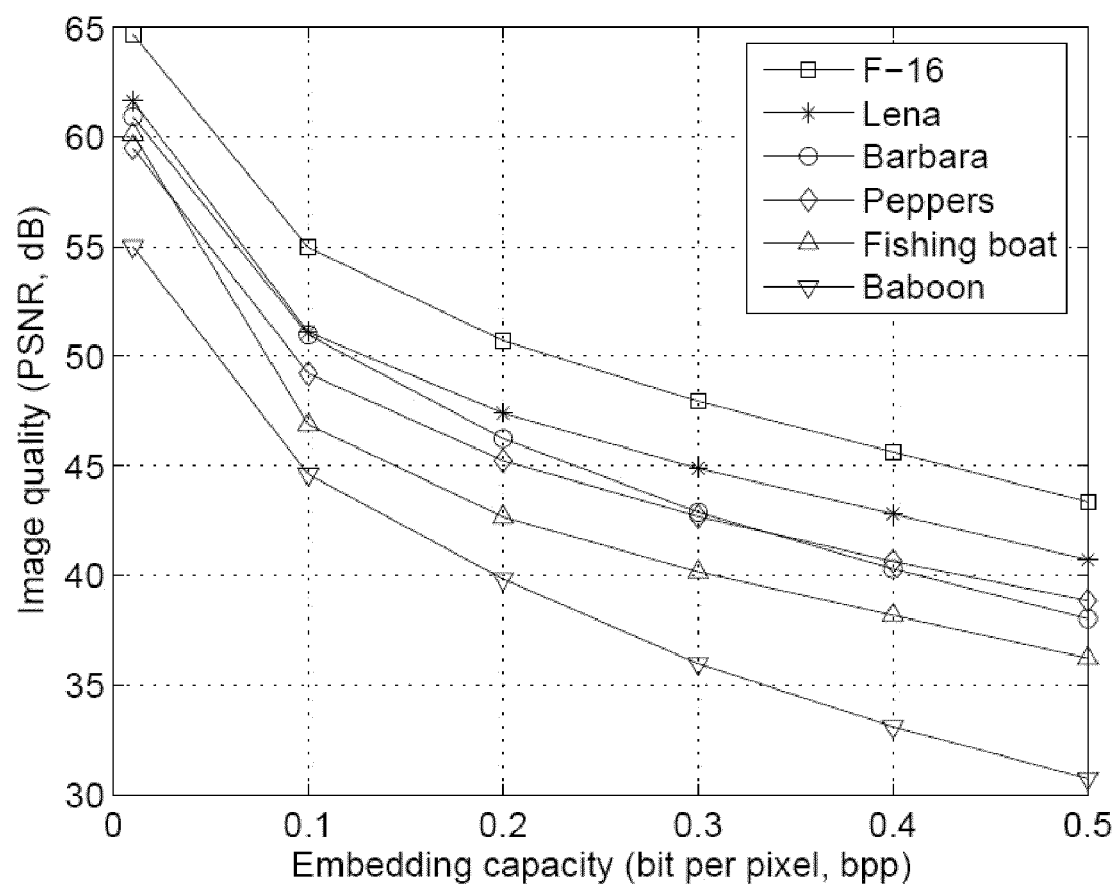
FIG. 4-12 are comparison graphs or images between the present invention and the prior art.

The proposed scheme is applied to various natural images, F-16 (Airplane), Lena, Barbara, Peppers, Fishing boat, and Baboon (Mandrill). FIG. 4 shows the quality of the watermarked images at various embedding capacities up to 0.50 bpp. In this experiment, the block size was set to 16×16. As shown in FIG. 4, the proposed scheme achieves high embedding capacity with low distortion. However the capacity-distortion performance depends on the characteristic of each image.

Figure 5:
Figure 5:
Figure 5:
Figure 5:
Figure 6:
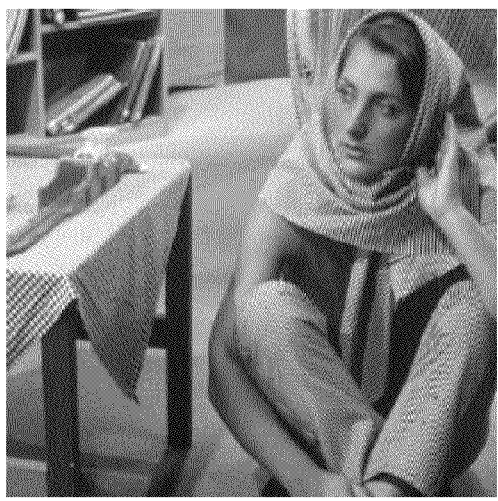
Figure 6:
Figure 6:
Figure 6:

High embedding capacity could be achieved with low distortion for images that contain large amount of low-frequency components, e.g. F-16 and Lena. On the other hand, for images that include large amount of high frequency components, e.g. Baboon, much lower embedding capacity was obtained at the same PSNR. FIG. 5 and FIG. 6 show the original image and the examples of the watermarked images at various embedding capacities for gray-scale Lena and Barbara images, respectively. As shown in the figures, the perceptual quality of the watermarked image is quite good at low and moderate embedding capacities and is acceptable even at very high embedding capacity around 1.0 bpp. Since the proposed reversible scheme embeds the watermark into the high-frequency wavelet coefficients, the high frequency components of the image are strengthened and the watermarked image seems to be filtered with sharpening mask. However the sharpening effect introduced by the watermark embedding is not perceptually annoying even at low PSNRs.

Figure 7:
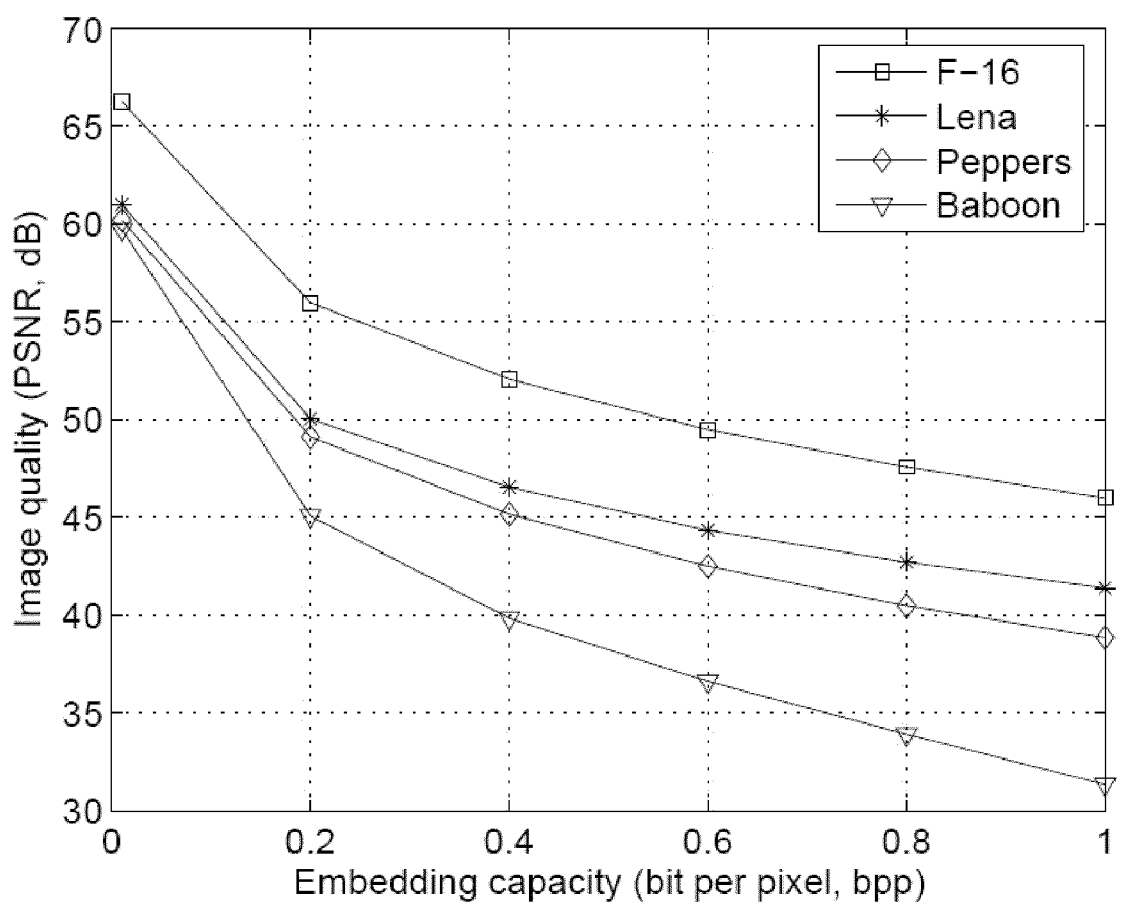
Figure 8:
Figure 8:
Figure 8:
Figure 8:
Figure 9:
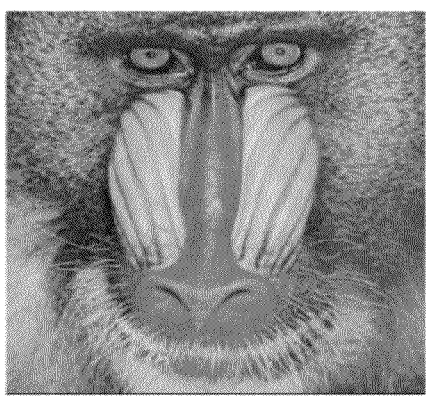
Figure 9:
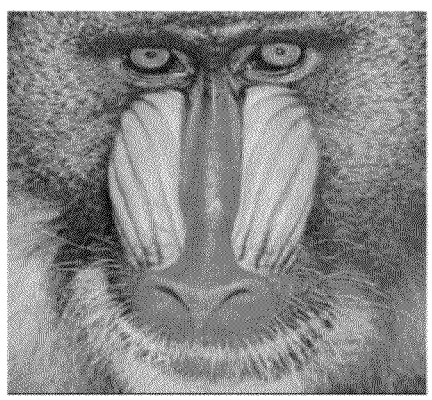
Figure 9:
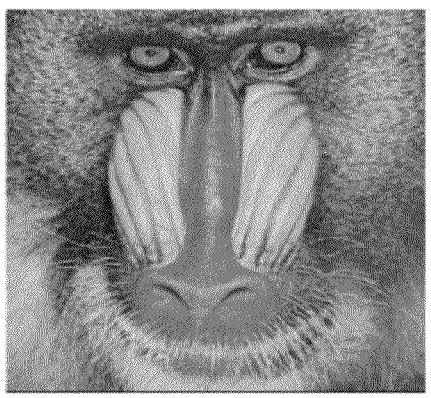
Figure 9:
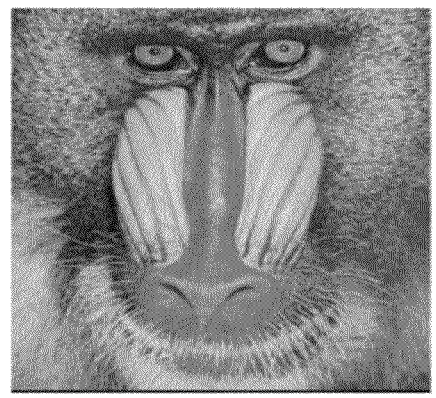

The proposed scheme is also applied to color images. FIG. 7 shows the PSNRs of the watermarked color images at various embedding capacities up to 1.0 bpp. The block size is set to 16×16 as in the previous experiments. The result in the figure shows that the capacity-distortion performance for color images also depends on the characteristic of each individual image. As in the case of gray-scale images, higher embedding capacity can be achieved at the same PSNR when the input image has more low frequency components, e.g. color F-16. FIG. 8 and FIG. 9 show the original image and the examples of the watermarked images at various embedding capacities for color Lena and Baboon images, respectively.

Even though the sharpening effect is observed as in gray-scale images, the perceptual quality of the watermarked image is quite good at all embedding capacities.

Figure 10:
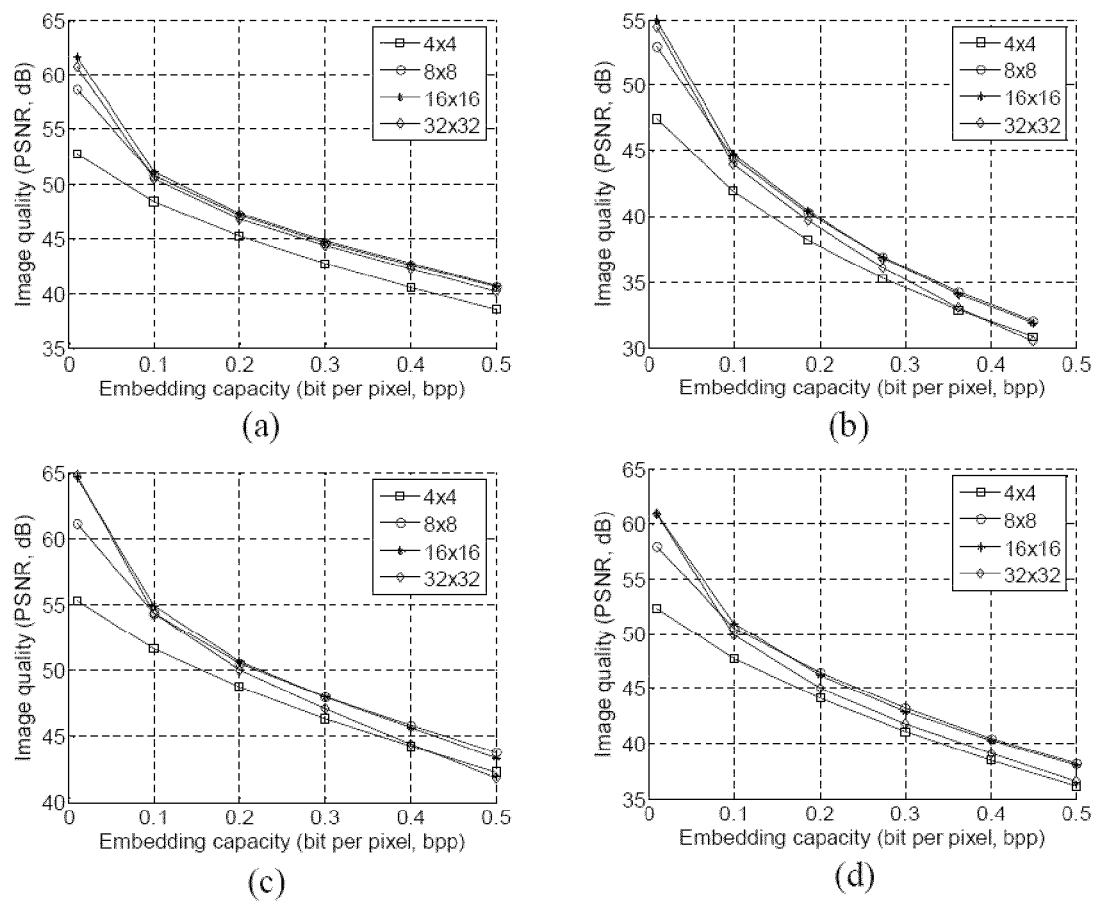

In the proposed scheme, the block size can be easily adjusted to the specific requirements of an application. FIG. 10 shows how the performance of the proposed scheme varies with different block sizes: 4×4, 8×8, 16×16, and 32×32. As shown in the figure, the performance of the proposed scheme is degraded when the block size is too small (4×4) or too large (32×32). The smaller the block size, the larger the amount of the side information becomes. For example, 0.1250 bpp is necessary to embed the location map and the original LSBs when the block size is 4×4, while only 0.0078 bpp is required for 16×16 block size. Since 0.1250 bpp is too high capacity to hold, the performance degrades when the block size is too small. When the block size is large, the amount of the side information that needs to be embedded is very small. However, block size that is too large makes the adaptive embedding less useful especially for high embedding capacity, and this degrades the performance of the proposed scheme.

B. Comparison of Performance with Other Schemes in the Literature

Figure 11:
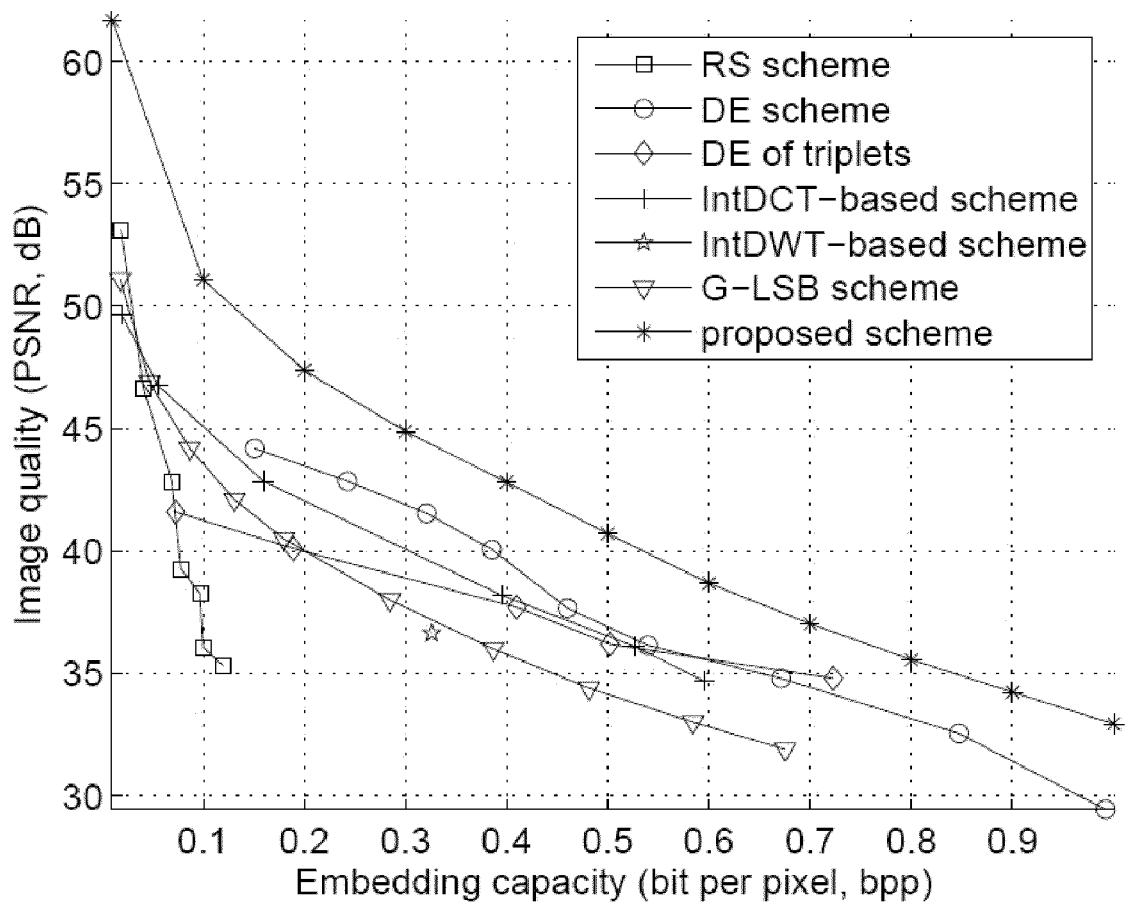
Figure 12:
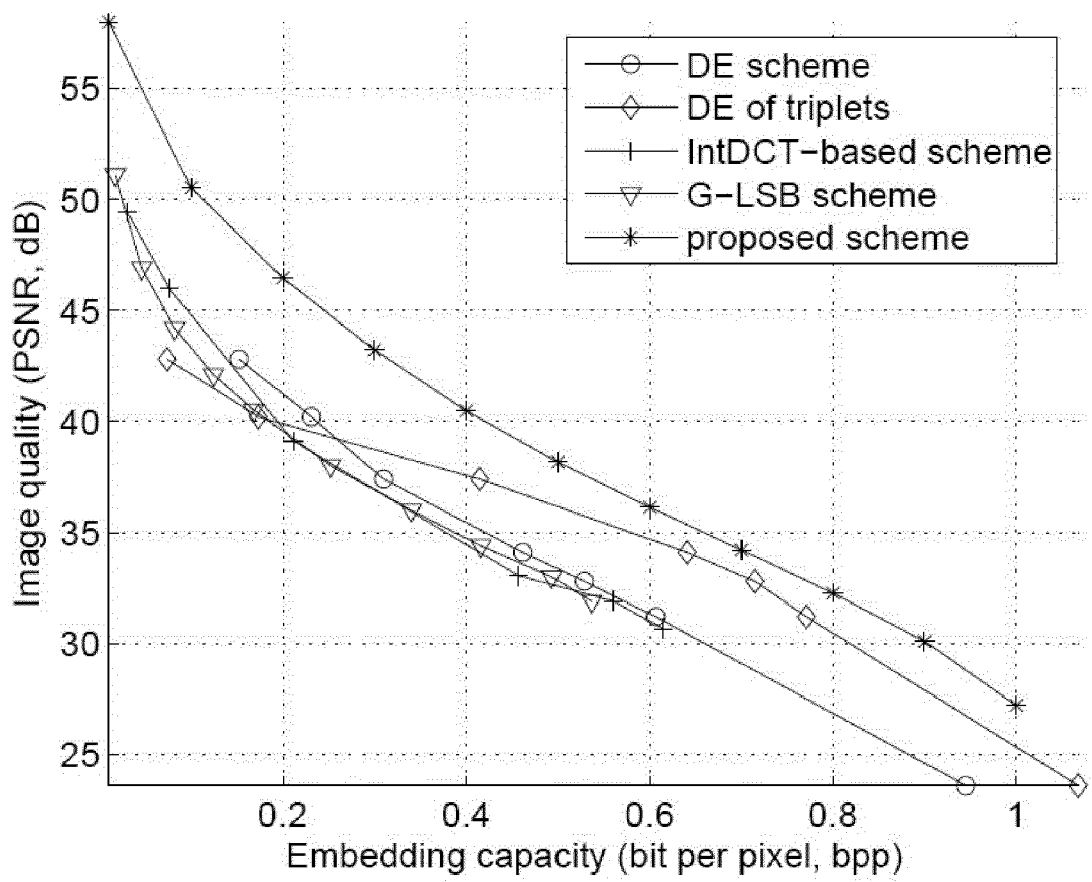

The performance of the proposed scheme is compared with the existing reversible schemes. FIG. 11 shows the comparison of the embedding capacity in bpp versus distortion in PSNR of the proposed scheme with that of the existing reversible schemes for the gray-scale Lena image. As shown in the figure, the RS scheme proposed by Fridrich et al. [3] has low embedding capacity (≦0.15 bpp) compared to the others. The integer DWT-based reversible embedding scheme proposed by Xuan et al. [14] does not provide an option for tradeoff between the embedding capacity and the perceptual quality, that is, for a given host image, the achievable capacity and image quality is fixed and can not be adjusted. In the other schemes, e.g. the difference expansion (DE) schemes proposed by Tian [4] and its variation [5], the integer DCT-based scheme proposed by Yang et al. [13], and the generalized LSB (G-LSB) scheme proposed by Celik et al. [11], the tradeoff between capacity and image quality is possible and relatively high embedding capacity can be achieved. However, as shown in the figure, the proposed scheme achieves higher embedding capacity with lower distortion than the other schemes. FIG. 12 shows the results for the gray-scale Barbara image. In this experiment, the performance of the proposed scheme is compared with only competitive schemes. As shown in the figure, the proposed scheme achieves higher embedding capacity at all PSNRs than the other schemes. The evaluation results in FIGS. 11 and 12 show that the proposed scheme outperforms the existing reversible schemes.

Although a preferred embodiment of the present invention has been described for illustrative purposes, those skilled in the art will appreciate that various modifications, additions and substitutions are possible, without departing from the scope and spirit of the invention as disclosed in the accompanying claims.

INDUSTRIAL APPLICABILITY

According to the preferred embodiment of the present invention, since watermarks are embedded in an integer-to-integer wavelet domain rather than a space domain, more data can be embedded without degrading image quality comparing to conventional watermarking methods.

Also, according to the preferred embodiment of the present invention, the condition to avoid underflow and overflow is provided.

Also, according to the preferred embodiment of the present invention, watermarks are adaptively embedded so as to minimize degradation of image quality. In addition to that, the adaptively embedding process is performed automatically, which enhances efficiency of watermarking process.

What is claimed is:

1. A method for embedding watermarks based on integer-to-integer wavelet transform, the method comprising the steps of:
   (A) dividing an original image (X×Y) to a plurality of image blocks (M×N);
   (B) selecting image blocks for embedding a location information that indicates image blocks to be watermarked;
   (C) embedding the location information into the image blocks selected in the step (B);
   (C-1) creating a matrix (P) whose elements indicate the number of bits that can be shifted in each image block; and
   (D) embedding watermark and side information into remaining image blocks which are not selected in the step (B),
   wherein the side information includes the matrix (P) and a set of original LSBs (Bo) replaced during the embedding of the location information.

2. The method as claimed in claim 1,
   wherein the location information is a location matrix (L) whose size [(X/M)×(Y/N)] is same as the size of the number of image blocks,
   wherein the location matrix (L) is constructed by, $$L(i, j) = \begin{cases} i, & \text{if } P(i, j) > 0 \\ 0, & \text{otherwise} \end{cases}$$

where $0 \leq i \leq (X/M)$ and $0 \leq j \leq (Y/N)$.

3. The method as claimed in claim 1,
   wherein the size of the matrix (P) is same as the size of the number of image blocks [(X/M)×(Y/N)],
   and wherein the step (C-1) further includes the steps of:
   (a) Setting an induced capacity (R) and all elements of the matrix (P) to zero;
   (b) Searching for the bit-shiftable blocks ($S_{ij}$) among the image blocks;
   (c) applying 1-bit shifting to all the bit-shiftable blocks ($S_{ij}$) searched in the step (b);
   (d) Searching for the block ($S_{\tilde{ij}}$) in which the watermark embedding may lead to the lowest mean-squared error among the blocks obtained by the step (c);
   (e) letting the induced embedding capacity (R) incremented by the number of shiftable blocks and letting the value of $P(\tilde{ij})$ incremented by 1;
   (f) determining whether the embedding capacity (R) is equal to or greater than the number of bits of watermarks and side information to be embedded;
   (g) performing the steps through (c) to (f) in case that the embedding capacity (R) is smaller than the number of bits of watermarks and side information to be embedded.

4. The method as claimed in claim 3,
after the step (f), further comprising the step of
(f') deleting the block ($S_{\hat{\hat{ij}}}$) from the blocks ($S_{ij}$) in case that the value of $P(\hat{\hat{ij}})$ is equal to $p_{max}$ or that the block ($S_{\hat{\hat{ij}}}$) is not bit-shiftable.

5. The method as claimed in claim 3,
wherein the step (f) is performed by the following inequality:

$$R \geq |B_m|+|B_o|=|B_m|+|B_l|=|B_m|+(XY)/(MN)$$

where $B_m$ is a set of message bits, $B_l$ is a set of bits in the location map (L), $B_o$ is a set of original LSBs replaced during the embedding of the location map via LSB-substitution, and | | is the cardinality of a set.

6. The method as claimed in claim 1,
wherein the step (B) is performed by the following inequality:

$$s_{min} - E_{WN}(m,n) \leq S_M(m,n) \leq s_{max} - E_{WP}(m,n)$$

for $0<m<M$ and $0<n<N$, where $s_{min}$ is a minimum pixel value, $s_{max}$ is a maximum pixel value, S is the image block, $S_M$ is a modified pixel block, and wherein $E_{WP}$ and $E_{WN}$ are given by the following equations:

$$E_{WP} = \sum_{i,j \in (HL_1 \cup LH_1 \cup HH_1)} \frac{1}{2}\{Q_{ij} + \text{ABS}(Q_{ij})\}$$

$$E_{WN} = \sum_{i,j \in (HL_1 \cup LH_1 \cup HH_1)} \frac{1}{2}\{Q_{ij} - \text{ABS}(Q_{ij})\}$$

where HL1, LH1 and HH1 are an high-low, low-high and high-high wavelet sub-band respectively, $Q_{ij}$=fDWT2$^{-1}(0_{ij})$ and the matrix $0_{ij}$ has only one non-zero element of value 1 in the ith row and the jth column.

* * * * *